United States Patent
Ouarti et al.

(10) Patent No.: US 9,558,676 B2
(45) Date of Patent: Jan. 31, 2017

(54) METHOD FOR SIMULATING SPECIFIC MOVEMENTS BY HAPTIC FEEDBACK, AND DEVICE IMPLEMENTING THE METHOD

(75) Inventors: Nizar Ouarti, Dourdan (FR); Anatole Lecuyer, Rennes (FR); Alain Berthoz, Paris (FR)

(73) Assignees: CENTRE NATIONAL DE LA RECHERCHE SCIENTIFIQUE (C.N.R.S.), Paris (FR); INSTITUT NATIONAL DE RECHERCHE EN INFORMATIQUE ET EN AUTOMATIQUE, Le Chesnay (FR)

( * ) Notice: Subject to any disclaimer, the term of this patent is extended or adjusted under 35 U.S.C. 154(b) by 816 days.

(21) Appl. No.: 13/496,687

(22) PCT Filed: Sep. 14, 2010

(86) PCT No.: PCT/EP2010/063463
§ 371 (c)(1),
(2), (4) Date: Jun. 27, 2012

(87) PCT Pub. No.: WO2011/032937
PCT Pub. Date: Mar. 24, 2011

(65) Prior Publication Data
US 2012/0259604 A1    Oct. 11, 2012

(30) Foreign Application Priority Data

Sep. 17, 2009   (FR) ..................... 09 56406

(51) Int. Cl.
*G06G 7/48*   (2006.01)
*G09B 9/28*   (2006.01)
(Continued)

(52) U.S. Cl.
CPC ................. *G09B 9/28* (2013.01); *G06F 3/016* (2013.01); *G09B 9/00* (2013.01)

(58) Field of Classification Search
USPC .............................................. 703/8
See application file for complete search history.

(56) References Cited

U.S. PATENT DOCUMENTS

| 2002/0005315 A1* | 1/2002 | Kind ............... | B62D 5/005 180/444 |
| 2002/0123812 A1* | 9/2002 | Jayaram ........... | G06T 19/20 700/98 |

OTHER PUBLICATIONS

Haption Dec. 15, 2007.*
(Continued)

*Primary Examiner* — Saif Alhija
(74) *Attorney, Agent, or Firm* — Troutman Sanders LLP

(57) ABSTRACT

The invention relates to a method for simulating the movements of a virtual vehicle, a user being in physical contact with a simulator including a force-feedback haptic interface, wherein said physical contact corresponds to at least one physical point of contact between the haptic interface and the body of the user that is representative of a virtual point of contact between the user and the virtual vehicle. Said method comprises at least two steps. A first step involves determining a linear acceleration vector (formula (I)) and a linear velocity vector (formula (II)) at the virtual point of contact between the user and the virtual vehicle, said vectors being representative of the movement of the vehicle at said point. A second step involves deducing a three-dimensional force vector (formula (III)) from the linear acceleration vector (formula (I)) and linear velocity vector (formula (II)), said force vector being predetermined by a linear combination of said linear acceleration and velocity vectors, the corresponding force being applied via the haptic interface substantially at the physical point of contact. The invention also relates to a device for simulating movements of a vehicle.

20 Claims, 2 Drawing Sheets

Figure 1:
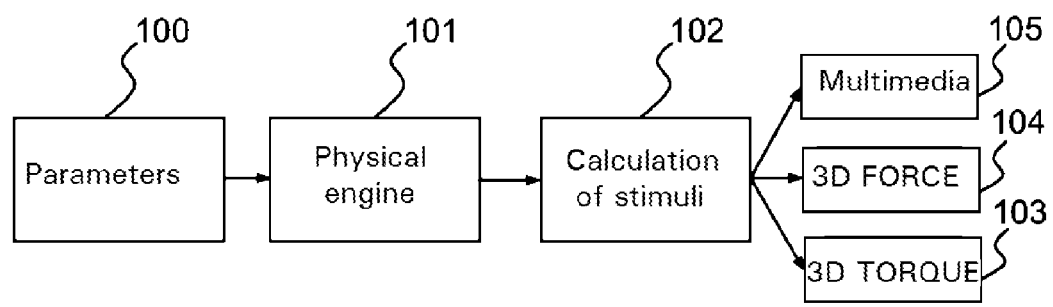

(51) Int. Cl.
*G09B 9/00* (2006.01)
*G06F 3/01* (2006.01)

(56) References Cited

OTHER PUBLICATIONS

Anonymous, "HAPTION Virtuose 6D35-45," retrieved from the Internet: http://web.archive.org/web/20071215161953/http://www.inition.co.uk/inition/pdf/ffhaptic_haption_6d35-45.pdf, p. 1-2 (2007).

Lecuyer et al., "Can Haptic feedback improve the perception of self-motion in virtual reality?," *Haptic Interfaces for Virtual Environment and Teleoperator Systems, Haptics '04 Proceedings, 12th International Symposium*, Chicago, IL, p. 208-215 (2004).

Int'l Search Report and Written Opinion issued in app. No. PCT/EP2010/063463 (2011).

\* cited by examiner

METHOD FOR SIMULATING SPECIFIC MOVEMENTS BY HAPTIC FEEDBACK, AND DEVICE IMPLEMENTING THE METHOD

CROSS REFERENCE TO RELATED APPLICATIONS

This application is a U.S. nationalization under 35 U.S.C. §371 of International Application No. PCT/EP2010/063463, filed Sep. 14, 2010, which claims priority to French application no. FR 0956406, filed Sep. 17, 2009. The disclosures set forth in the referenced applications are incorporated herein by reference in their entireties.

The invention relates to a method for simulating movements by haptic feedback and a device implementing the method. It is in particular applicable to the fields of movement simulation and perception. The invention can for example be implemented in automobile or aircraft simulators, video games, theme park attractions, or auditoriums, for example movie theaters.

The perception of one's own movement, in particular in humans, is the result of a complex mechanism in which several modes are involved. The involved modes are in particular touch, hearing, vision, proprioception, and the vestibular system. In the rest of the description, the haptic mode is defined as being the compound of the touch and proprioception modes. By acting on one mode, it is possible to cause an immobile or practically immobile individual to have an impression of movement. It is also possible to stimulate several modes at the same time to reinforce that impression. To that end, multimodal perception mechanisms are the subject of many studies, such as for instance the article by O. Ernst and M. S. Banks entitled *Human integrate visual and haptic information in a statistically optimal fashion*, Nature, Vol. 415, January 2002.

Today there are three main approaches based on mechanical stimuli with the aim of giving an individual an impression of movement. In parallel, a visual stream is usually projected on a screen in order to stimulate the vision.

The principle of the first approach lies in the transmission of vibrations to a user. The term "user" hereafter designates any individual using a movement simulation device and thus capable of feeling an impression of movement. If said user is seated on a seat, one or more vibrating devices can be positioned under that seat and be activated when the transmission of an impression of movement is decided. This approach is the most rudimentary of the three approaches, but also the least expensive to implement. In fact, the signals making it possible to control the vibrating devices are simple and the frequency band of the vibrations is limited. On the other hand, such an approach does not contribute to imparting an impression of acceleration.

The second approach is based on the use of hydraulic jacks. A simulator using this approach is usually made up of a cab secured on a jack-powered platform, the user being present in the cab. Controlling the jack makes it possible to tilt the cab and it is thus possible to impart an impression of movement. Unlike the approach based on the use of vibrating devices, an impression of acceleration can be transmitted, but intermittently. Furthermore, this type of approach involves significant implementation costs.

In a third approach, which is also expensive, rails are used to set a cab or seat on which the user is positioned in motion. This approach makes it possible to impart a short-lasting impression of acceleration, due to the limited size of the rails used. Another limitation related to this method is that the simulation of movement is not in real-time. In fact, calculations related in particular to the simulated movement trajectory must be done before setting the cab or seat in motion on the rails. Furthermore, the implementation of this approach leads to large equipment.

A shared limitation of these three approaches is that a long and continuous impression of acceleration cannot be transmitted.

One aim of the invention is in particular to offset the aforementioned drawbacks.

To that end, the invention relates to a method for simulating the movements of a virtual vehicle, a user being in physical contact with a simulator including a force-feedback haptic interface, wherein said physical contact corresponds to at least one physical point of contact between the haptic interface and the body of the user that is representative of a virtual point of contact between the user and the virtual vehicle. This method comprises at least two steps. A first step involves determining a linear acceleration vector $\vec{a}_{lin}$ and a linear velocity vector $\vec{v}_{lin}$ at the virtual point of contact between the user and the virtual vehicle, said vectors being representative of the movement of the vehicle at said point. A second step involves deducing a three-dimensional force vector $\vec{F}_{3D}$ from the linear acceleration vector $\vec{a}_{lin}$ and linear velocity vector $\vec{v}_{lin}$, said force vector being predetermined by a linear combination of said linear acceleration and velocity vectors, the corresponding force being applied via the haptic interface substantially at the physical point of contact.

According to one aspect of the invention, the force $\vec{F}_{3D}$ can be deduced, for example, from a linear combination of the linear acceleration powers, linear velocity powers, and linear acceleration time derivative powers.

According to one aspect of the invention, the method comprises a step for determining an angular acceleration vector $\vec{a}_{ang}$ at the virtual point of contact between the user and the haptic interface, said vector being representative of the movement of the vehicle at said virtual point of contact.

The method for example comprises a step deducing a three-dimensional torque vector $\vec{C}_{3D}$ of the angular acceleration vector $\vec{a}_{ang}$, said torque vector being proportional to said acceleration vector and the corresponding torque being applied by the haptic interface substantially at the physical point of contact.

The force $\vec{F}_{3D}$ for example verifies the following expression:

$$\vec{F}_{3D} = \alpha \times m \times \vec{a}_{lin}$$

in which:
$\vec{a}_{lin}$ is the linear acceleration vector set in three dimensions;
$\alpha$ is a configurable real coefficient;
m is the mass of the simulated vehicle.

In one embodiment, the torque $\vec{C}_{3D}$ verifies the following expression:

$$\vec{C}_{3D} = \beta \times I \times \vec{a}_{ang}$$

in which:
$\vec{a}_{ang}$ is the angular acceleration vector shown in three dimensions;
$\beta$ is a configurable real coefficient that can assume a positive or negative value;
I is the moment of inertia of the simulated vehicle.

In one embodiment, the physical point of contact between the haptic interface and the user corresponds to a rigid support point with the virtual vehicle.

In another embodiment, the physical point of contact between the haptic interface and the user corresponds to a virtual point of contact with control equipment of the virtual vehicle.

The invention also relates to a device for simulating movements of a virtual vehicle, a user being in physical contact with the device comprising a force-feedback haptic interface, said physical contact corresponding to at least one physical point of contact between the haptic interface and the body of the user that is representative of a virtual point of contact between the user and the virtual vehicle. Said device comprises means for determining a linear acceleration vector $\vec{a}_{lin}$ and a linear velocity vector $\vec{v}_{lin}$ at the virtual point of contact between the user and the virtual vehicle, said vectors being representative of the movement of the virtual vehicle at said point and means for deducing a three-dimensional force vector $\vec{F}_{3D}$ from the linear acceleration vector $\vec{a}_{lin}$ and from the velocity vector $\vec{V}$, said force vector being determined by linear combination of said linear acceleration and velocity vectors, the corresponding force being applied by the haptic interface substantially at the point of contact.

In one embodiment of the invention, the force $\vec{F}_{3D}$ is deduced from a linear combination of the linear acceleration powers, linear velocity powers, and linear acceleration time derivative powers.

According to one embodiment, the device comprises a means for determining an angular acceleration vector $\vec{a}_{ang}$ at the point of contact between the user and the haptic interface, said vector being representative of the movement of the vehicle at said point of contact.

The device for example comprises a means for deducing a three-dimensional torque vector $\vec{C}_{3D}$, from the angular acceleration vector $\vec{a}_{ang}$, said torque vector being proportional to said acceleration vector and the corresponding torque being applied by the haptic interface substantially at the point of contact.

According to one embodiment, the haptic interface is a force-feedback arm comprising a column used as point of contact with the user's body.

According to another embodiment, the haptic interface is a force-feedback arm comprising a force-feedback wheel used as point of contact with the user's body.

The device for example comprises means for projecting a sequence of video images to the user, said sequence being representative of the simulated movement of the vehicle.

The invention in particular has the decisive advantage of being able to be implemented without causing a significant bulk. Furthermore, it may be used in the context of real-time simulations.

Figure 2:
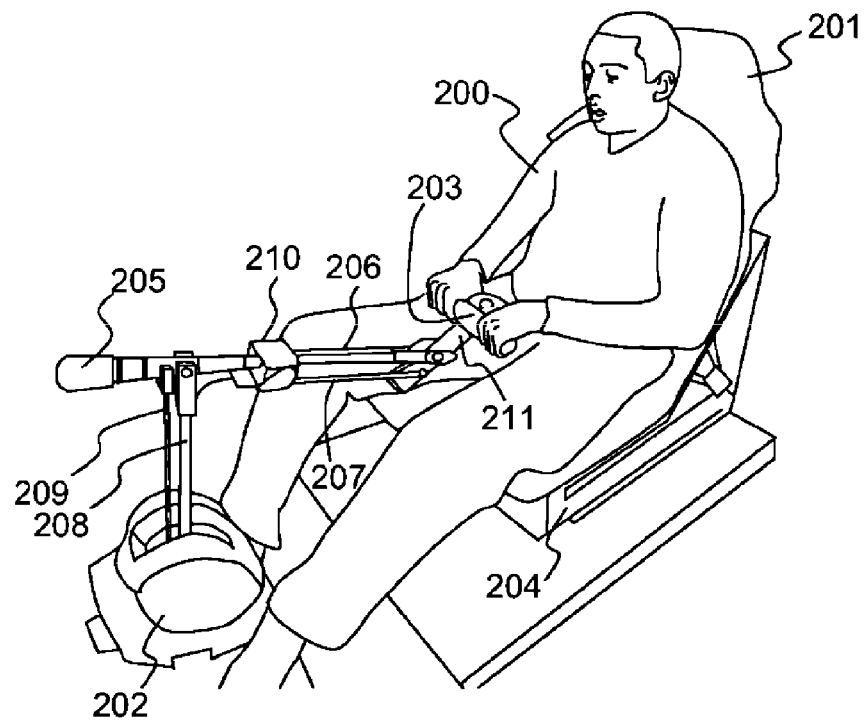
Figure 3:
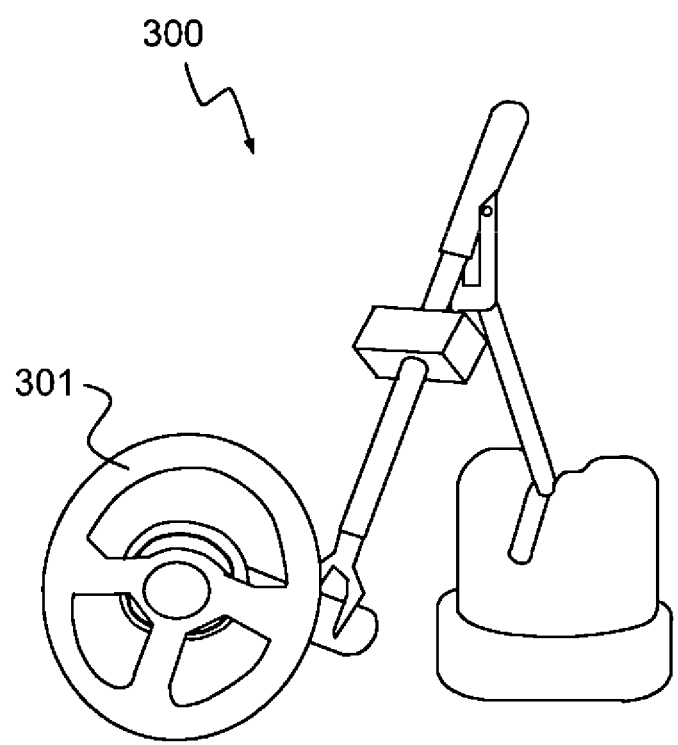

Other features and advantages of the invention will appear using the following description, provided for information and non-limitingly, done in light of the appended drawings, in which:

FIG. 1 illustrates the movement simulation method according to the invention;

FIG. 2 provides an example of a simulation device implementing the method according to the invention;

FIG. 3 provides an example of a force-feedback arm associated with a force-feedback wheel.

FIG. 1 illustrates the movement simulation method according to the invention. The method in particular makes it possible to control a haptic interface, for example with force-feedback. A sensation of movement is transmitted to the user stimulated by said haptic interface.

A force-feedback haptic interface is usually used to reconstitute physical sensations related to an action visually perceived on a screen, for example. To that end, the haptic interface bears on at least one mechanical device making it possible to transmit so-called feedback forces to the user of the interface.

In the field of vehicle, boat, or aircraft movement simulation, a force-feedback wheel or handle can be used as haptic interface. The resistance effects related to driving may then potentially be felt by the user. In the rest of the description, the term "vehicle" is used and designates any mobile equipment able to contain at least one user.

The method according to the invention can be broken down in three steps, for example, a prior step and two main steps.

A prior configuration step 100 makes it possible to define the type of vehicle simulation and its characteristics. Thus, the environment in which the vehicle moves is clearly defined. If the simulated vehicle is a rail vehicle, it is then possible to choose the travel and the type of rails used. It is also possible to configure the type of terrain used, for example uneven terrain. Other elements and their properties can also be selected, for example the type of sky or presence of the ocean and its location in the virtual movement space of the simulated vehicle.

This configuration step 100 also makes it possible to select the type of vehicle simulated, called virtual vehicle in the rest of the description. For example, a train, bicycle, car, airplane, or boat can be selected. The vehicle can also correspond to a human being so as to simulate a walking-type movement, for example. It is also in this configuration step 100 that the type of connection, rigid or not, can be determined between a virtual point of contact and the virtual vehicle. A virtual point of contact is defined as a part of the virtual vehicle with which the user is intended to interact virtually, such as a wheel, a bar in a bus, a rope attached to a wagon, or any other part of the virtual vehicle that may be in contact with the user. In the rest of the description, a physical point of contact is defined as being the part of the haptic interface used in real contact with the user.

In a first main step 101, a physical engine analyzes the virtual movements of the simulated vehicle in a three-dimensional space using methods existing in the state of the art and determines a linear acceleration vector $\vec{a}_{lin}$ and an angular acceleration vector $\vec{a}_{ang}$ caused by the movement of the vehicle on the part(s) of the body in contact with the haptic interface, said vectors being shown in a three-dimensional space. The physical engine can also estimate the velocity of the vehicle. This estimation can take into account the rigid or non-rigid aspect of the connection of the virtual point of contact with the rest of the vehicle, the linear and angular accelerations at the virtual point of contact are determined. The physical engine can also estimate the angular velocities $\vec{v}_{lin}$ and $\vec{v}_{ang}$ of the vehicle.

In a second main step 102, stimuli commands are calculated so as to control the hepatic interface 103, 104. In fact, the linear and angular acceleration vectors at the virtual point of contact are then translated into force and torque applied substantially at the physical point of contact, the parts of the body in contact with the haptic interface thus being stimulated, said vectors being shown in a three-dimensional space. Other commands 105 can also be determined by the engine in order to control other equipment, of the multimedia type for example. Said multimedia equipment for example makes it possible to project a sequence of images on a screen accompanied by sounds representative of the movement of the vehicle intended for the user. Sounds present in the environment can also be broadcast.

It is possible, in a given embodiment, for the simulated vehicle not to appear visually at the multimedia equipment, but for the movements thereof to be simulated at the haptic interface, this mode advantageously being able to be used in the context of navigation applications. The user can thus move in a virtual city, for example, while having an illusion of movement.

The haptic interface is in contact at least at one point with the user and that point corresponds either to a support point rigidly connected with the vehicle or a non-rigid point of contact, for example with control equipment of said vehicle such as a control handle or a wheel or an element attached to the vehicle such as a rope. The point of contact between the haptic interface and the user can correspond to a virtual support point of the user on the vehicle having a visco-elastic connection, with or without friction, with the rest of the vehicle.

During the performance of the third step of the method, a feedback force and a torque are determined so as to be applied on the user's body at the physical point of contact with the haptic interface, for example on the hands. If there are several physical points of contact, it is possible to determine a force and a torque for each of those points. This force 104 and this torque 103 are three-dimensional and respectively proportional to the linear acceleration and angular acceleration vectors determined in the preceding step.

The feedback force $\vec{F}_{3D}$, i.e. the force exerted by the force-feedback haptic interface, can be described by a three-dimensional vector according to the following expression:

$$\vec{F}_{3D} = \alpha \times m \times \vec{a}_{lin} \quad (1)$$

in which:
$\vec{a}_{lin}$ is the linear acceleration vector at the virtual point of contact shown in three dimensions;
$\alpha$ is a configurable real coefficient;
m in the mass of the vehicle.

The coefficient $\alpha$ can be positive or negative. This means that the force $\vec{F}_{3D}$ can be oriented in the same direction or opposite direction of the acceleration $\vec{a}_{lin}$. The possibility of parameterizing $\alpha$ wisely and thus choosing the direction and the intensity of the force $\vec{F}_{3D}$ makes it possible to adapt the simulation to the user.

When a force-feedback arm is used as haptic interface, the force $\vec{F}_{3D}$ can be expressed as a function of the stiffness factor of said arm using the following expression:

$$\vec{F}_{3D} = k_r \times \vec{\lambda} \quad (2)$$

in which:
$k_r$ is the stiffness factor of the arm;
$\vec{\lambda}$ is a three-dimensional vector representing the movement of the force-feedback arm.

Using expressions (1) and (2), it is then possible to connect the coefficient $\alpha$ to $\vec{\lambda}$ in the following expression:

$$\vec{\lambda} = \alpha \times \left(\frac{m}{k_r}\right) \times \vec{a}_{lin} \quad (3)$$

This expression in particular makes it possible to adjust the coefficient $\alpha$ to the characteristics of the force-feedback arm used.

In one alternative embodiment, the force $\vec{F}_{3D}$ can be deduced from a linear combination of the acceleration $\vec{a}_{lin}$, the linear velocity $\vec{v}_{lin}$, and the derivative of the linear acceleration $\vec{J}$ using the following expression:

$$\vec{F}_{3D} = \alpha \times m \times \vec{a}_{lin} + \alpha' \times \vec{v}_{lin} + \alpha'' \times \vec{J} \quad (4)$$

in which
$\alpha'$ is a second configurable real coefficient;
$\alpha''$ is a third configurable real coefficient;
$\vec{J}$ is the vector representing the time derivative of the linear acceleration vector, usually designated by the Anglo-Saxon expression "jerk".

In one alternative embodiment of the invention, the force $\vec{F}_{3D}$ can be expressed as a linear combination of powers of the linear acceleration, powers of the linear velocity, and powers of the time derivative of the linear acceleration. The force $\vec{F}_{3D}$ can also be determined by using information on the trajectory of the vehicle, such as for example the curve radius or the position of said vehicle.

As previously explained, the second main step 102 of the method determines a feedback force and a torque applied on the user's body at the physical point of contact with the haptic interface. The torque is applied substantially at the application point of the force $\vec{F}_{3D}$ and can be expressed using the following expression:

$$\vec{C}_{3D} = \beta \times I \times \|\vec{a}_{ang}\| \times \vec{r} \quad (5)$$

in which:
$\vec{a}_{ang}$ the angular acceleration vector at the virtual point of contact shown in three dimensions;
$\beta$ is a configurable real coefficient that can assume a positive or negative value;
I is the moment of inertia of the simulated vehicle;
$\vec{r}$ is a unitary rotation vector having the same direction as $\vec{C}_{3D}$.

The torque $\vec{C}_{3D}$ can also be expressed using the following expression:

$$\vec{C}_{3D} = \tau \times \theta \times \vec{r} \quad (6)$$

in which:
$\tau$ is the twist constant of the force-feedback arm;
$\theta$ is the angle to be traveled.

It is then possible to connect $\theta$ to the coefficient $\beta$ using the following expression:

$$\theta = \beta \times \left(\frac{I}{\tau}\right) \times \|\vec{a}_{ang}\| \quad (7)$$

Expression (7) thus makes it possible to adjust the coefficient $\beta$ to the characteristics of the haptic interface used.

FIG. 2 provides an example of a simulation device implementing the method according to the invention. In this example, the user 200 is seated on a seat 201, representative of that present in the simulated vehicle. Calculation means such as microprocessors associated with storage circuits can be used to perform the different steps of the method according to the invention described previously. Said means can for example be placed in the base 204 of the seat 201. One or more pieces of multimedia equipment can be used. For example, a screen can be placed in front of the seat 201, as well as a plurality of audio enclosures positioned around said seat, this multimedia equipment not being shown in the figure. The multimedia information can also be transmitted using a head-mounted display, of the hmd type for example, allowing a portable version of the multimedia equipment. The haptic interface used in this example is a force-feedback arm. The latter is made up of a base connected to two parallel mechanical axes 208, 209 called base axes, said axes being able to pivot in a same plane around an axis of rotation located in the base, the two axes remaining parallel during the pivoting movement. A first end of the base axes is connected to the base and a second end is connected to a mechanical axis called primary axis 205. The movement of the base axes makes it possible to cause a two-dimensional rotational movement of the primary axis. The primary axis comprises three sub-axes 205, 206, 207 and an engine block 210. A first sub-axis 205 is connected to the base axes 208, 209 and one of its ends is connected to the engine block 210, said block being stationary relative to the first sub-axis 205. The engine block is also connected to the other two sub-axes 206, 207 of the primary axis, called column sub-axes. The engine block makes it possible to cause rotational and translational movements relative to said two sub-axes, the three sub-axes 206, 207, 205 remaining oriented in a same direction. A column is connected to the two column sub-axes 203. The column is for example made up of an arm 211 connected to said sub-axes and a contact part 203, the operator being in contact with said part, for example by grasping it with both hands. The controlled movements of the different axes thus allow the transmission of the force $\vec{F}_{3D}$ and the torque $\vec{C}_{3D}$ at the column.

The force-feedback arm controlled by using the stimuli commands previously described makes it possible to transmit an impression of movement to the user. During the haptic stimulation, the user is intended to resist the force $\vec{F}_{3D}$ and the torque $\vec{C}_{3D}$ to which he is subjected. There is therefore no theoretical limitation to the duration of the impression of movement felt by the user.

FIG. 3 provides an example of a force-feedback arm associated with a force-feedback wheel. The force-feedback arm 300 is similar to that described using FIG. 2, except for the part corresponding to the column. In fact, it is possible to use a force-feedback wheel 301. Combined with the other elements of the arm, it is possible to have a three-dimensionally translatable wheel whereof the axis is no longer only the fixed axis of the wheel, but a three-dimensional axis of rotation. In fact, in the case of a car, for example, turning on an inclined road, the torque received in the driver's hands is not necessarily in the axis of the wheel.

The invention claimed is:

1. A method for simulating movements of an individual in a virtual vehicle in a space, said method comprising the steps of:
    a user being in physical contact with a simulator including a force-feedback haptic interface, wherein said physical contact corresponds to at least one physical point of contact between the haptic interface and the body of the user that is representative of a virtual point of contact between the user and the virtual vehicle;
    determining a linear acceleration vector $\vec{a}_{lin}$ at the virtual point of contact between the user and the virtual vehicle, said vector corresponding to the acceleration of the virtual vehicle at said point in the space;
    deducing a three-dimensional force vector $\vec{F}_{3D}$ from the linear acceleration vector $\vec{a}_{lin}$; and
    applying the force vector as at least one of a three-dimensional torque and a three-dimensional force via the haptic interface on the body substantially at the physical point of contact, resulting in a dynamic simulation of a user movement and feel in the virtual vehicle in the space.

2. The method according to claim 1, wherein the force $\vec{F}_{3D}$ is deduced from a linear combination of the linear acceleration powers, linear velocity powers, and linear acceleration time derivative powers.

3. The method according to claim 1, comprising a step of determining an angular acceleration vector $\vec{a}_{ang}$ at the virtual point of contact between the user and the haptic interface, said vector being representative of the movement of the vehicle at said virtual point of contact.

4. The method according to claim 3, comprising a step of deducing a three-dimensional torque vector $\vec{C}_{3D}$ of the angular acceleration vector $\vec{a}_{ang}$, said torque vector being proportional to said acceleration vector and the corresponding torque being applied by the haptic interface substantially at the physical point of contact.

5. The method according to claim 1, wherein the force $\vec{F}_{3D}$ verifies the following expression:

$$\vec{F}_{3D} = \alpha \times m \times \vec{a}_{lin}$$

in which:

$\vec{a}_{lin}$ is the linear acceleration vector set in three dimensions;

α is a configurable real coefficient; and m is the mass of the simulated vehicle.

6. The method according to claim 4, wherein the torque $\vec{C}_{3D}$ verifies the following expression:

$$\vec{C}_{3D} = \beta \times I \times \vec{a}_{ang}$$

in which:

$\vec{a}_{ang}$ is the angular acceleration vector set in three dimensions;

β is a configurable real coefficient that can assume a positive or negative value; and I is the moment of inertia of the simulated vehicle.

7. The method according to claim 5, wherein the torque $\vec{C}_{3D}$ verifies the following expression:

$$\vec{C}_{3D} = \beta \times I \times \vec{a}_{ang}$$

in which:

$\vec{a}_{ang}$ is the angular acceleration vector set in three dimensions;

β is a configurable real coefficient that can assume a positive or negative value; and I is the moment of inertia of the simulated vehicle.

8. The method according to claim 1, wherein the physical point of contact between the haptic interface and the user corresponds to a rigid support point with the virtual vehicle.

9. The method according to claim 1, wherein the physical point of contact between the haptic interface and the user corresponds to a virtual point of contact with control equipment of the virtual vehicle.

10. A device for simulating movements of an individual in a virtual vehicle in a space, said device comprising:
- a user being in physical contact with the device comprising a force-feedback haptic interface, said physical contact corresponding to at least one physical point of contact between the haptic interface and the body of the user that is representative of a virtual point of contact between the user and the virtual vehicle;
- a determiner determining a linear acceleration vector $\vec{a}_{lin}$ at the virtual point of contact between the user and the virtual vehicle, said vector corresponding to the acceleration of the virtual vehicle at said point in the space; and
- a deducer deducing a three-dimensional force vector $\vec{F}_{3D}$ from the linear acceleration vector $\vec{a}_{lin}$,
- wherein the haptic interface applies the force vector at the body as at least one of a three-dimensional torque and a three-dimensional force substantially at the point of contact, resulting in a dynamic simulation of the movement and a feel of the user in the virtual vehicle in the space.

11. The device according to claim 10, wherein the force $\vec{F}_{3D}$ is deduced from a linear combination of the linear acceleration powers, linear velocity powers, and linear acceleration time derivative powers.

12. The device according to claim 10, wherein the device comprises an angular determiner determining an angular acceleration vector $\vec{a}_{ang}$ at the point of contact between the user and the haptic interface, said vector being representative of the movement of the vehicle at said point of contact.

13. The device according to claim 11, wherein the device an angular determiner determining an angular acceleration vector $\vec{a}_{ang}$ at the point of contact between the user and the haptic interface, said vector being representative of the movement of the vehicle at said point of contact.

14. The device according to claim 12, comprising a torque deducer deducing a three-dimensional torque vector $\vec{C}_{3D}$ from the angular acceleration vector $\vec{a}_{ang}$, said torque vector being proportional to said acceleration vector and the corresponding torque being applied by the haptic interface substantially at the point of contact.

15. The device according to claim 13, comprising a torque deducer deducing a three-dimensional torque vector $\vec{C}_{3D}$, from the angular acceleration vector $\vec{a}_{ang}$, said torque vector being proportional to said acceleration vector and the corresponding torque being applied by the haptic interface substantially at the point of contact.

16. The device according to claim 11, wherein the haptic interface is a force-feedback arm comprising a column used as point of contact with the user's body.

17. The device according to claim 11, wherein the haptic interface is a force-feedback arm comprising a force-feedback wheel used as point of contact with the user's body.

18. The device according to claim 11, comprising a projector projecting a sequence of video images to the user, said sequence being representative of the simulated movement of the vehicle.

19. The method according to claim 1, wherein the virtual vehicle can be at least one of a train, a bicycle, a car, an airplane and a boat.

20. The device according to claim 10, wherein the virtual vehicle can be at least one of a train, a bicycle, a car, an airplane and a boat.

* * * * *